DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1233

T912,013

HIGHLY ACCURATE UNCONDITIONALLY STABLE METHOD FOR INTEGRATING ORDINARY DIFFERENTIAL EQUATIONS

Werner Liniger and Farouk M. Odeh, Yorktown Heights, N.Y., assignors to International Business Machines Corporation, Armonk, N.Y.

Filed June 30, 1972, Ser. No. 267,806
**Int. Cl. G06f *15/32***
U.S. Cl. 444—1
8 Sheets Drawing. 52 Pages Specification

The present invention generally relates to a novel method for operating an electronic computer to perform integration operations upon a set of ordinary differential equations. The overall method is illustrated in the flow chart of FIG. 1. According to a first aspect of the invention occurring in block 7 of FIG. 1, there is disclosed an averaging process comprising the following steps. Select an order of accuracy $p$ for the underlying linear multistep formulae solutions which are to be averaged. Select a number $d$ by which the averaging process is to raise the order of accuracy $p$ of the individual underlying solutions. Select a linear multistep formula of order $p$ and a sufficiently large step number $k$ to produce underlying solutions, wherein the formula must contain at least $m \geq d$ free primary parameters and one secondary parameter $c$, the coefficient of the leading derivative found in the formula. Determine the number N and form of the constraints which the weights must satisfy for the averaging process to raise the order from $p$ to $p+d$. Select N different sets of values of the free parameters. Compute the N weights satisfying the N constraints. Compute N solutions of the differential equations, each of order $p$, each associated with one of the parameter sets selected, and average these N solutions to obtain a solution having an order of accuracy of $p+d$.

Figure 1:
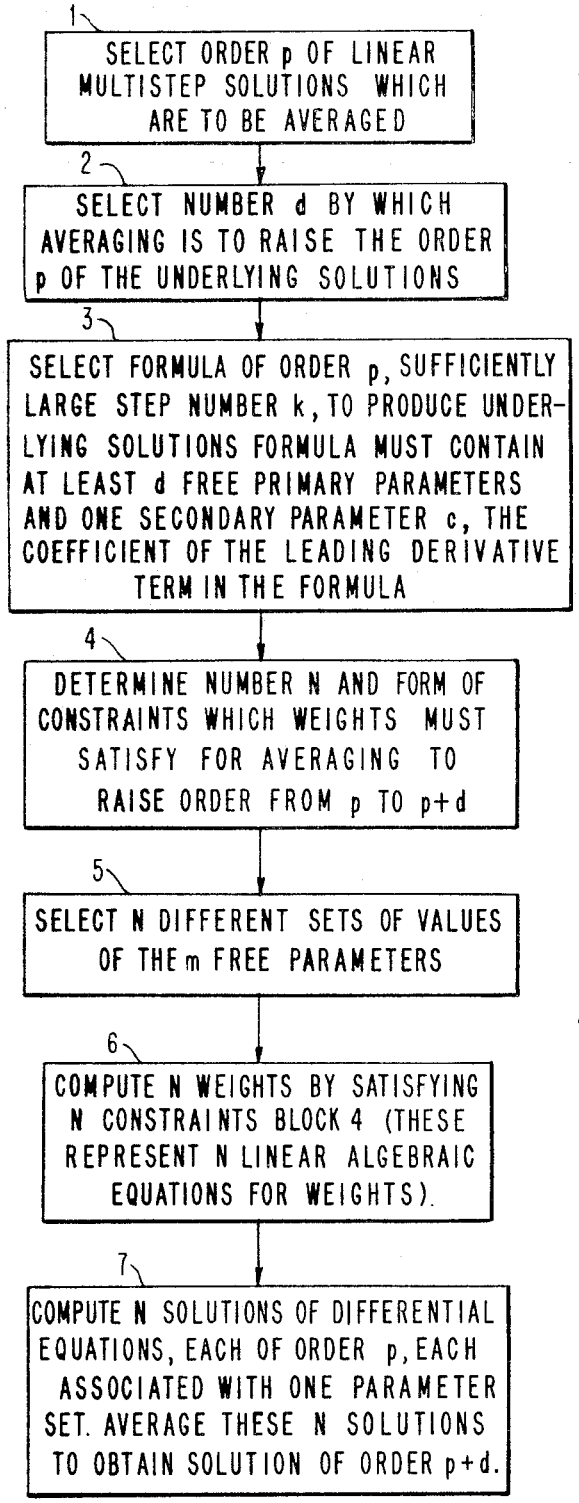
Figure 2:
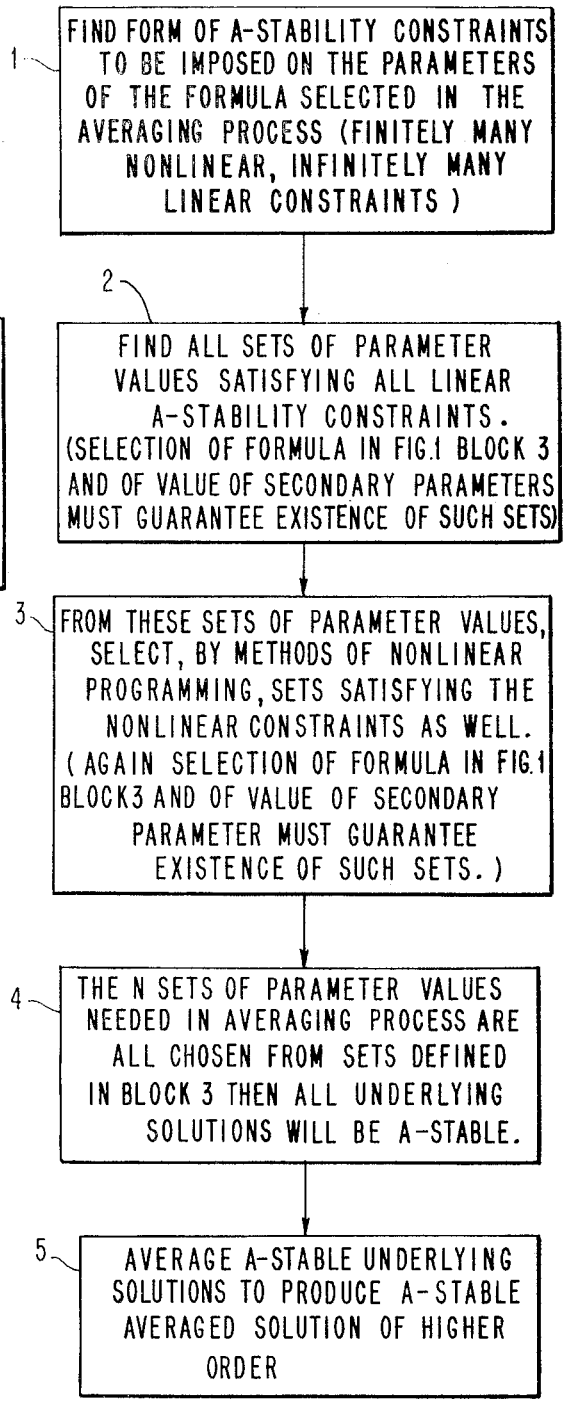
Figure 3:
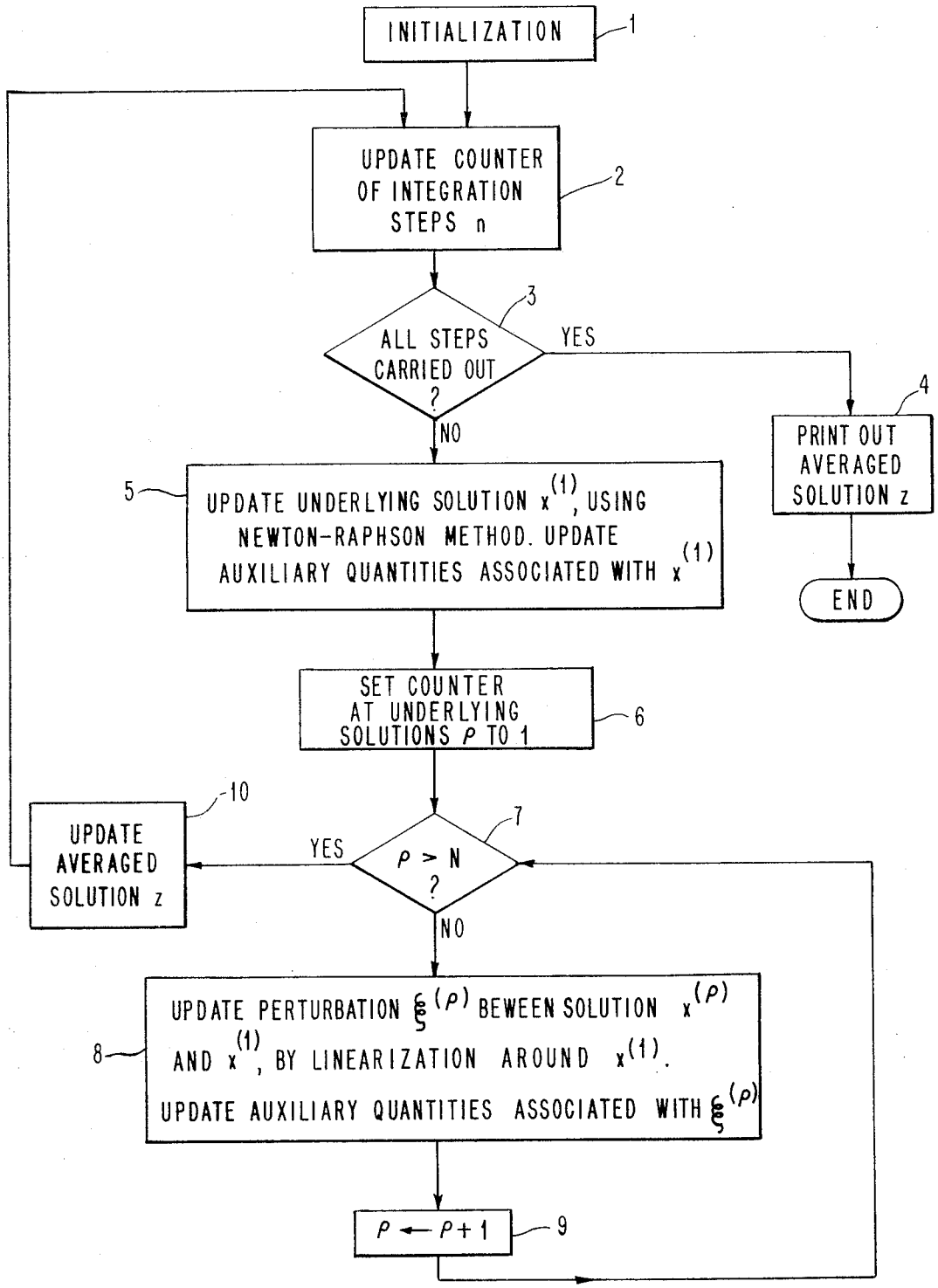
Figure 4:
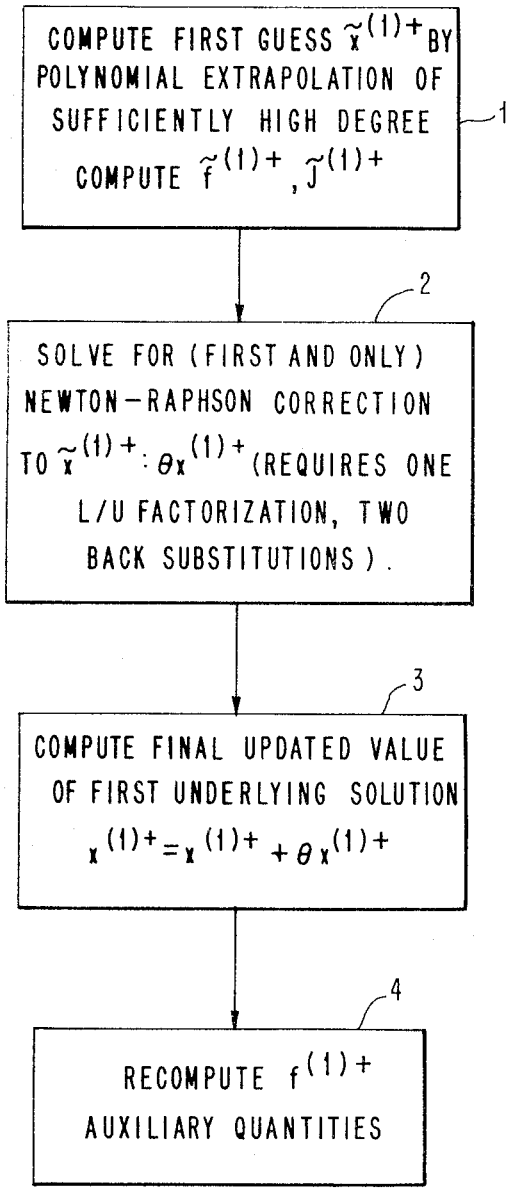
Figure 5:
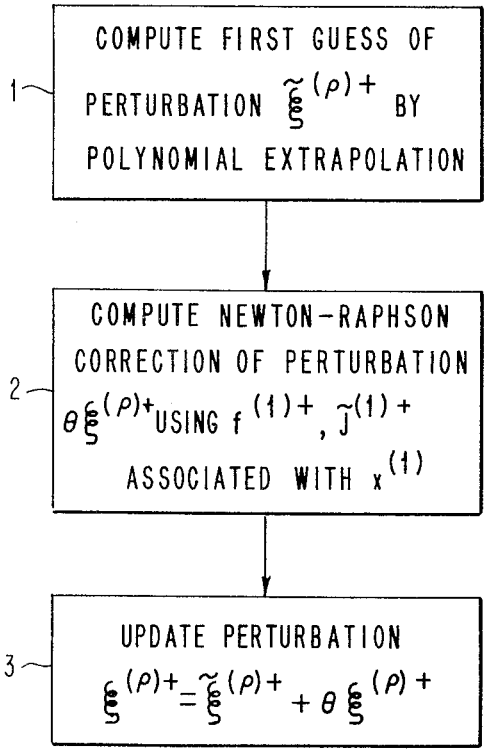
Figure 8:
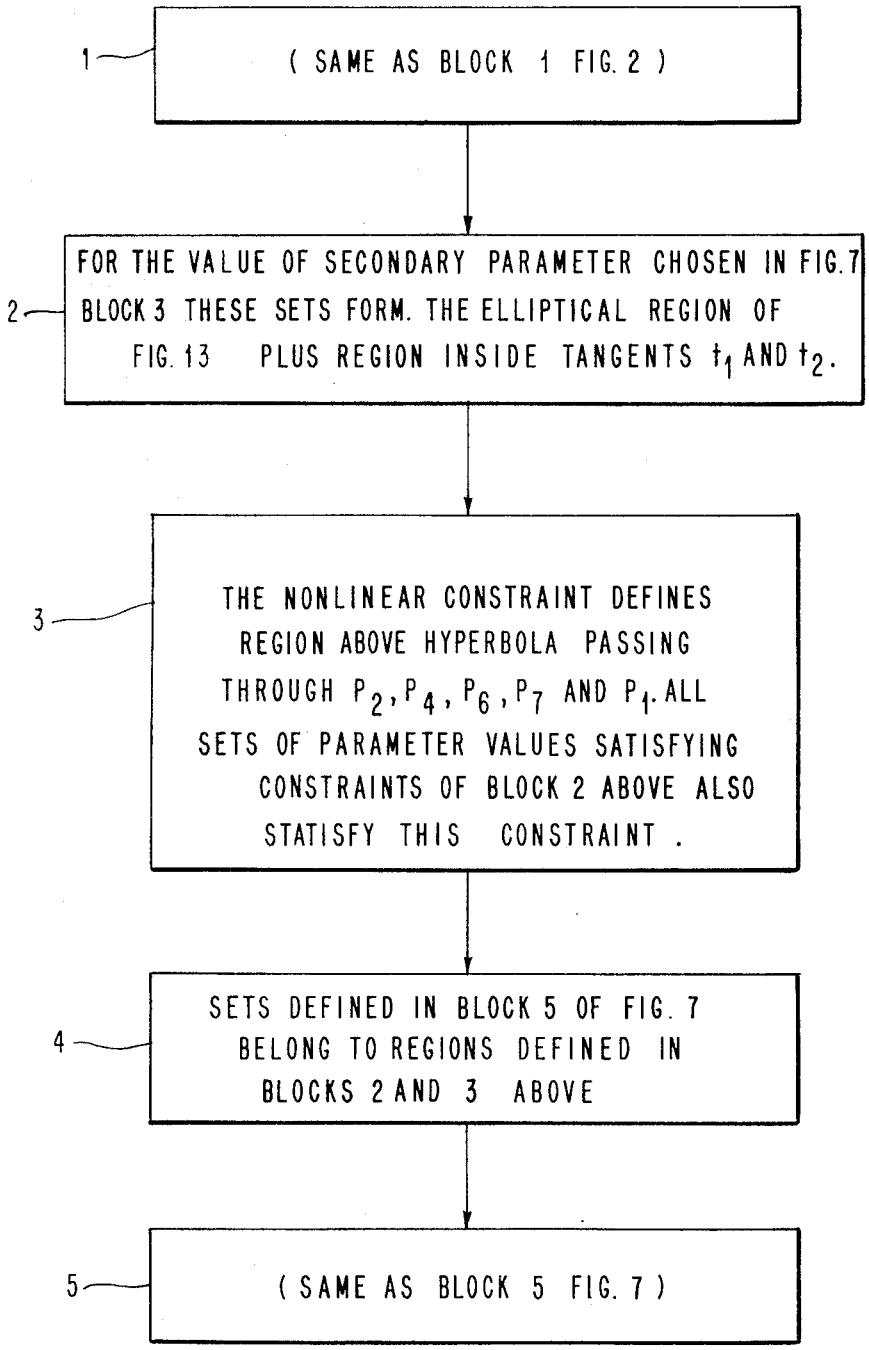
Figure 9:
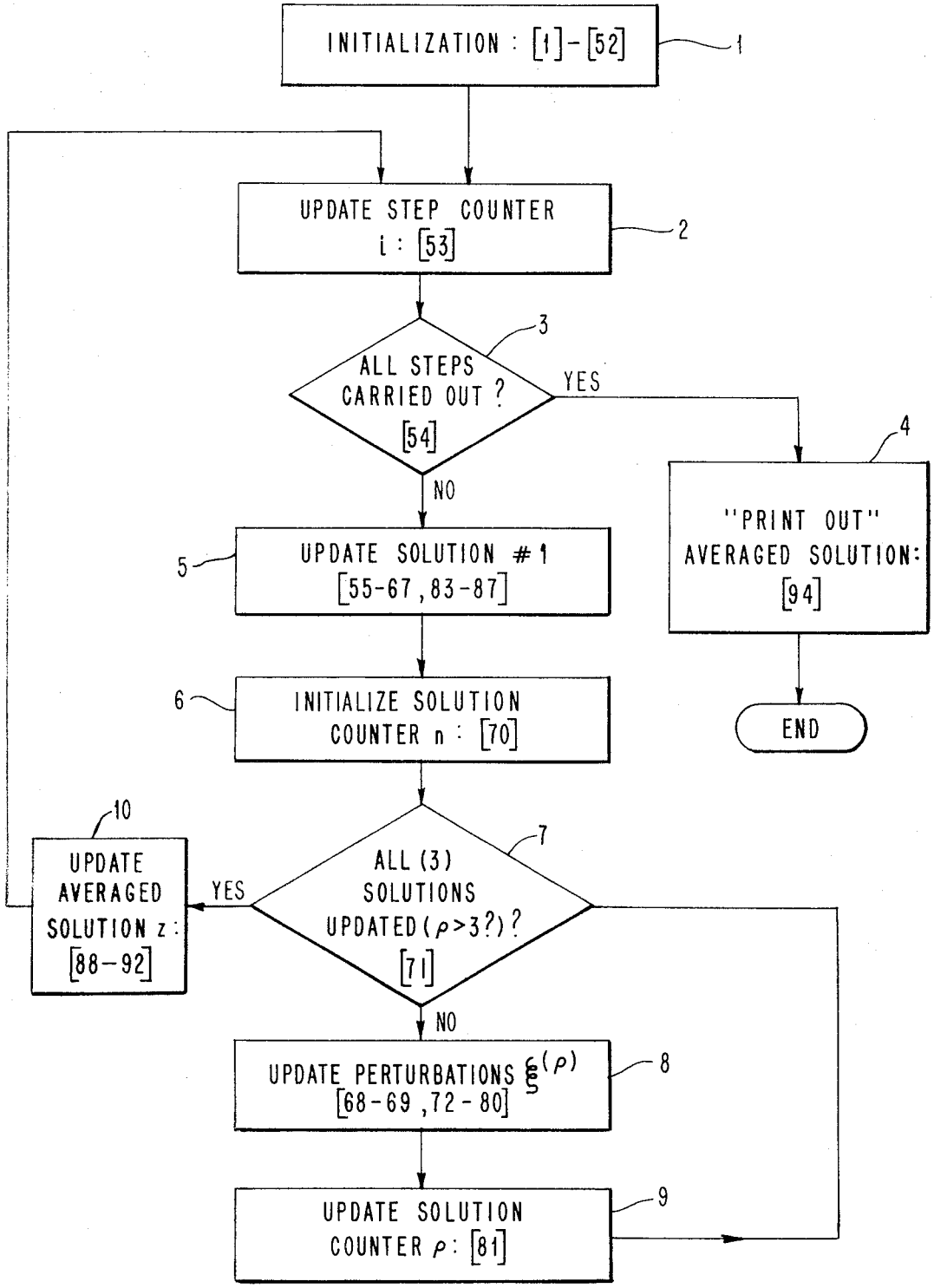
Figure 10:
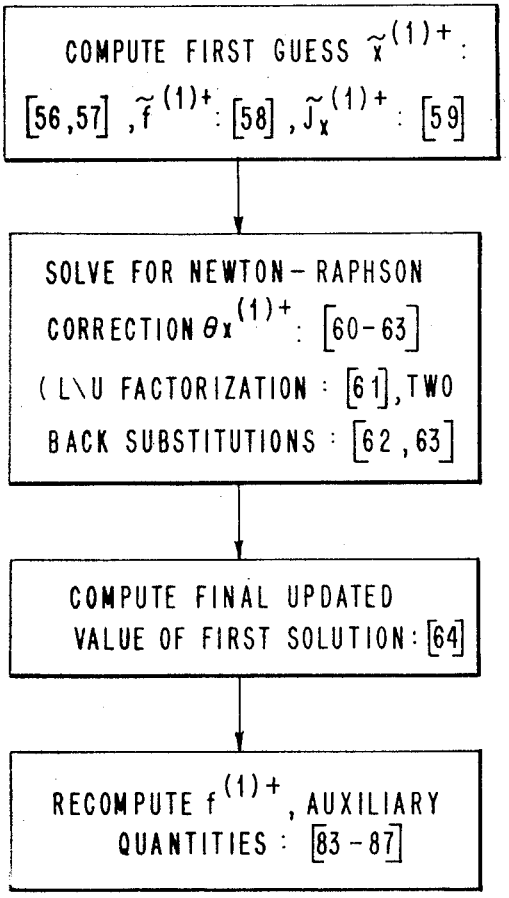
Figure 11:
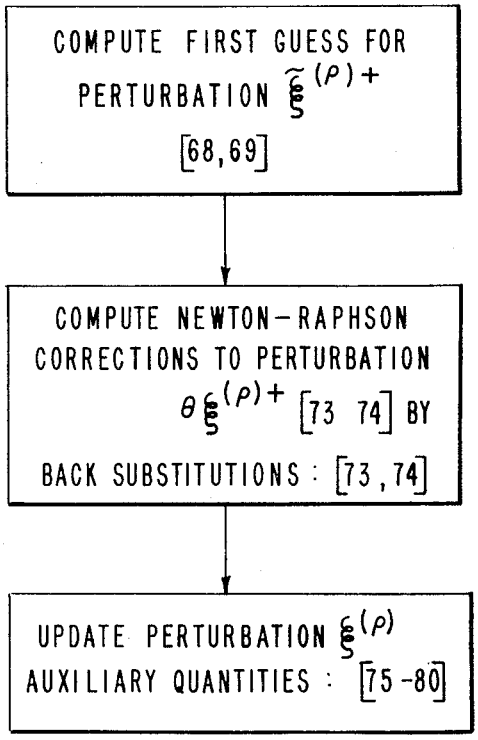
Figure 12:
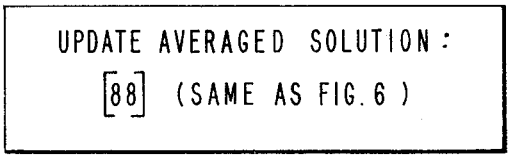
Figure 13:
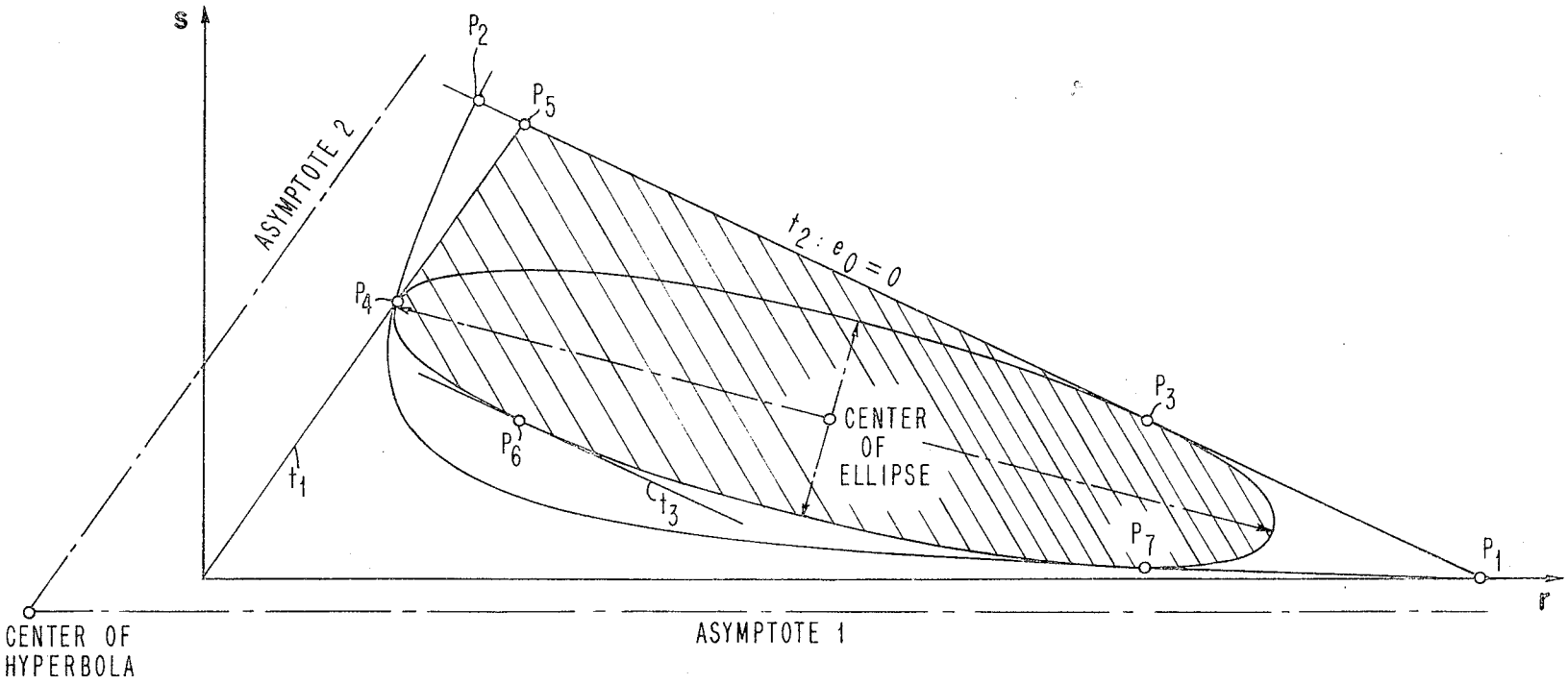

According to a second aspect of the invention which occurs in block 3 of FIG. 1, A-stability is maintained by carrying out the following steps. First, find the form of the A-stability constraints to be imposed on the parameters of the formula selected in the averaging process. These constraints consist of infinitely many linear, and finitely many nonlinear inequalities. Next, find all sets of parameter values satisfying all linear A-stability constraints.

From these sets of parameter values select, by methods of nonlinear programming, sets satisfying the nonlinear constraints as well. It should be noted that the above selection of parameters is contingent upon selecting an appropriate linear multistep formula as set forth in the first aspect of the invention. In other words, if a proper linear multistep formula meeting the specified constraints is chosen, it is possible to also select proper parameter values to obtain the desired stability results.

The third and most significant aspect of the present invention comprises the actual integration procedure. This operation occurs primarily in block 7 of FIG. 1. An initialization step includes loading the system with infor-

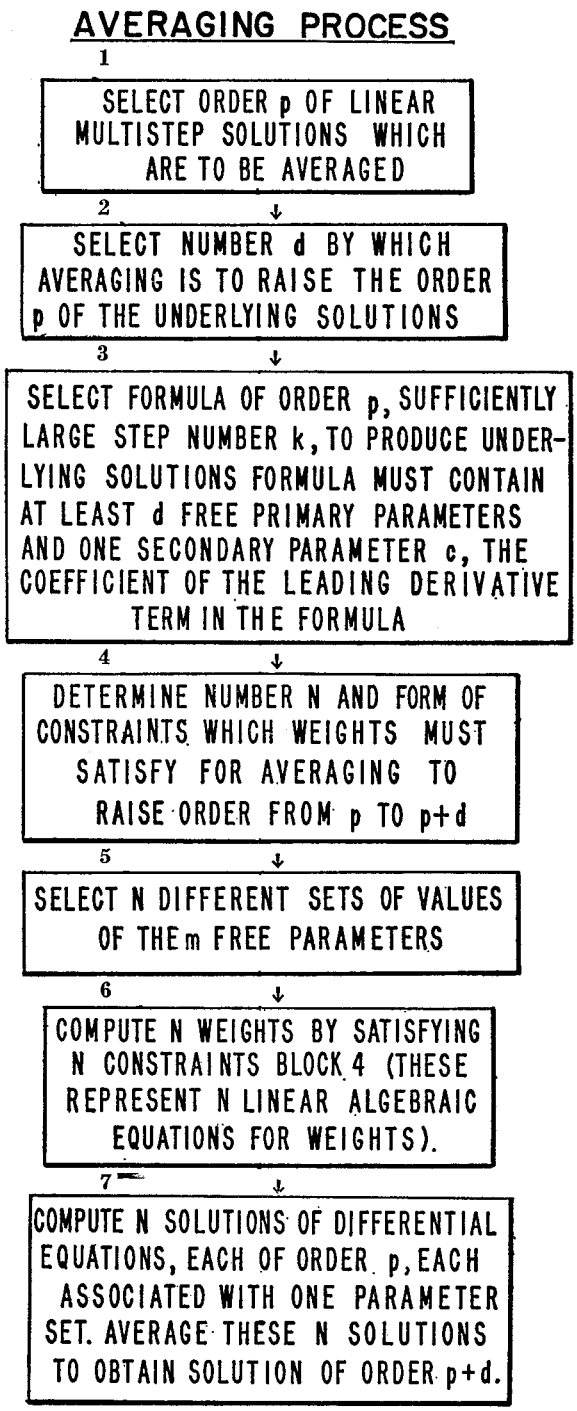

PUBLISHED JULY 24, 1973

912 O.G. 1233 mation pertaining to the previously selected linear multistep formula as well as with the solution values necessary for starting the integration. Also, the integration step $h$, step number $k$ and the previously enumerated parameter value selections are loaded during initialization. The first step of the actual integration process is to update the counter $n$ of integration steps, a test is then carried out to see if all required steps have been completed. If yes, the averaged solution $z$ is printed out and the program ends. If not, then an integration step is performed, comprising computing the first underlying solution $x^{(1)}$ of the system of ordinary differential equations by the Newton-Raphson method, as well as auxiliary quantities associated with said first underlying solution.

AVERAGING PROCESS

A-STABILITY

INTEGRATION PROCEDURE (FIG.1 BLOCK 7)

NONLINEAR PROCEDURE FOR UPDATING FIRST UNDERLYING SOLUTION (FIG.3 BLOCK 5)

LINEAR PROCEDURE FOR UPDATING UNDERLYING SOLUTIONS $x^{(\rho)}$, $\rho = 2 \cdots, N$.

(FIG.3 BLOCK 8)

FIG. 6

AVERAGING (FIG. 3 BLOCK 10)

UPDATE AVERAGED SOLUTION USING UPDATED SOLUTION $x^{(1)+}$ AND UPDATED PERTURBATIONS $\xi^{(\rho)+}$, $\rho = 2, \cdots, N$ : $z^+ = x^{(1)+} + \sum_{\rho=2}^{N} \nu_\rho \xi^{(\rho)+}$ HERE $\nu_\rho$ $\rho = 2, \cdots, N$, ARE WEIGHTS CORRESPONDING TO SOLUTIONS $\rho = 2, \cdots, N$ (SEE FIG. 1 BLOCK 6).

FIG. 7

AVERAGING PROCESS

1 $p = 2$

2 $d = 2$

3 $$\Delta x - h\left[c\Delta\dot{x} + \dot{x} + \left(\frac{1}{2} - c\right)\nabla\dot{x} + \left(\frac{5}{12} - c + r\right)\nabla^2\dot{x} + \left(\frac{3}{8} - c + s\right)\nabla^3\dot{x}\right] = 0$$

$k = 4$ ; $m = d = 2$ ; $c = 4$

4 $N = 3$

CONSTRAINTS : $\nu_1 + \nu_2 + \nu_3 = 1$ $r_1\nu_1 + r_2\nu_2 + r_3\nu_3 = 0$ $s_1\nu_1 + s_2\nu_2 + s_3\nu_3 = 0$

5 $r_1 = 7, s_1 = 2$ ; $r_2 = 5, s_2 = 2$ ; $r_3 = 7, s_3 = 1$ : [2]

6 $\nu_1 = -4.5$, $\nu_2 = 3.5$, $\nu_3 = 2$ : [3-5]

7 COMPUTE 3 SOLUTIONS OF ORDER 2, ASSOCIATED WITH $(r,s) = (7,2), (5,2)$, AND $(7,1)$ RESPECTIVELY. AVERAGE 3 SOLUTIONS TO OBTAIN SOLUTION OF ORDER 4

A-STABILITY

INTEGRATION PROCEDURE

NONLINEAR PROCEDURE FOR UPDATING FIRST UNDERLYING SOLUTION

LINEAR PROCEDURE FOR UPDATING UNDERLYING SOLUTIONS $x^{(\rho)}$, $\rho = 2,3$

AVERAGING